United States Patent
Fultz et al.

(10) Patent No.: US 7,640,337 B1
(45) Date of Patent: Dec. 29, 2009

(54) FRAMEWORK FOR APPLICATION MONITORING AND MANAGEMENT

(75) Inventors: David K. Fultz, Raymore, MO (US);
Laura M. Haverkamp, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 825 days.

(21) Appl. No.: 10/975,276

(22) Filed: Oct. 28, 2004

(51) Int. Cl.
*G06F 15/173* (2006.01)

(52) U.S. Cl. .................. 709/224; 709/223; 709/203; 709/204; 709/205; 709/206; 709/207

(58) Field of Classification Search ......... 709/223–225, 709/203–207
See application file for complete search history.

(56) References Cited

U.S. PATENT DOCUMENTS

2002/0175938 A1* 11/2002 Hackworth ............... 345/751

2005/0138111 A1* 6/2005 Aton et al. ............... 709/201
2005/0155041 A1* 7/2005 Dinh et al. ............... 719/314

OTHER PUBLICATIONS

Ding, Yiping, "Performance Modeling with Application Response Measurement (ARM): Pros and Cons," BGS Systems, Inc., 12 pgs.

* cited by examiner

*Primary Examiner*—Bunjob Jaroenchonwanit
*Assistant Examiner*—Hua Fan

(57) ABSTRACT

A system is provided for monitoring one or more applications. The system includes a data store to maintain data, such as logs stored in a log file, describing transactions involving at least one of the applications. Some of the data includes context specific information which may be of varying length or content. The system includes agents, adapters, a controller, and a console. The agents communicate the data to the data store according to a configured delivery method. The adapters receive the data from the applications and forward the data to one of the agents. The controller manages the agents and is operable to analyze the data. The console is coupled to the controller to receive command inputs from a user to provide the analysis of the data to the user.

21 Claims, 5 Drawing Sheets

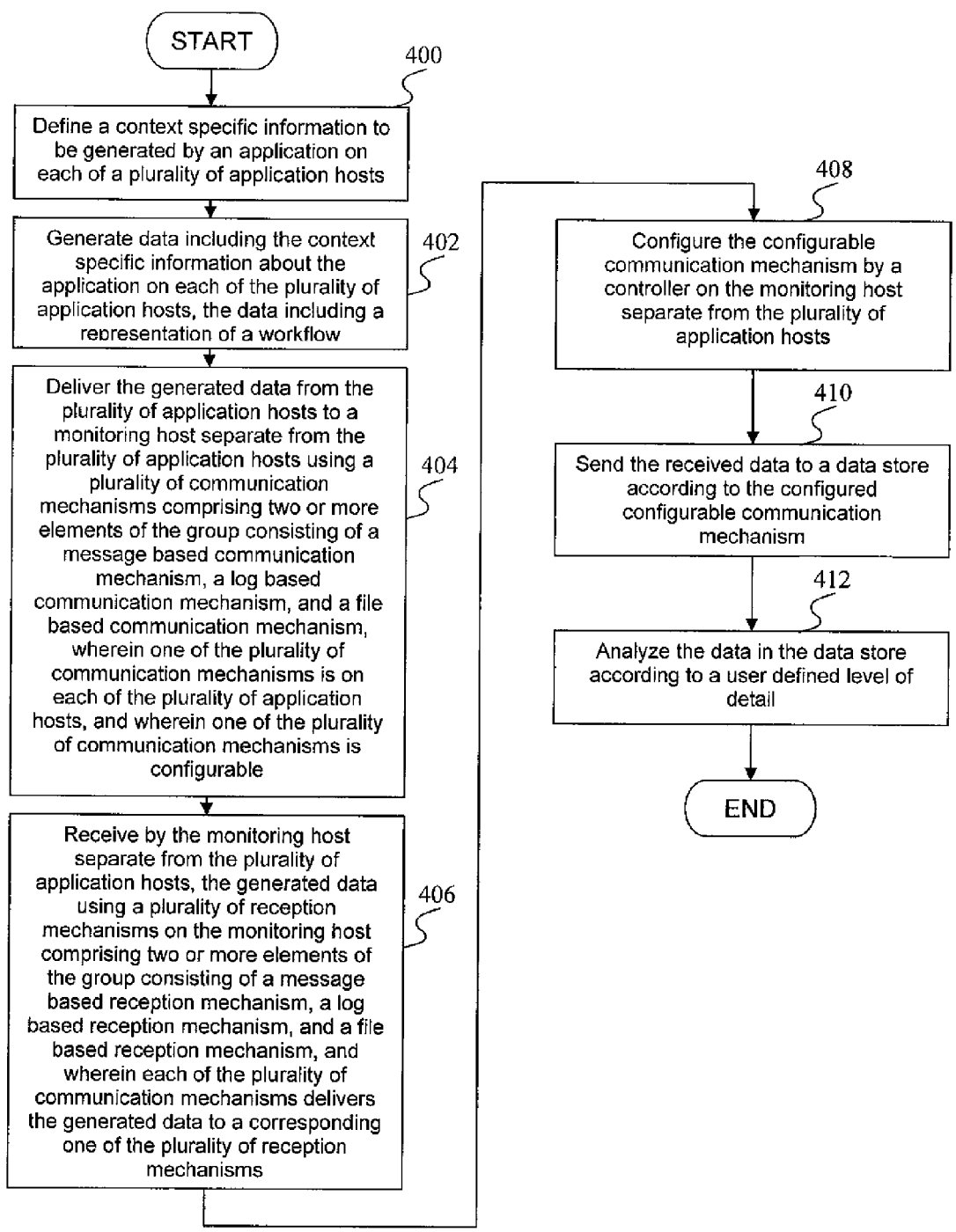

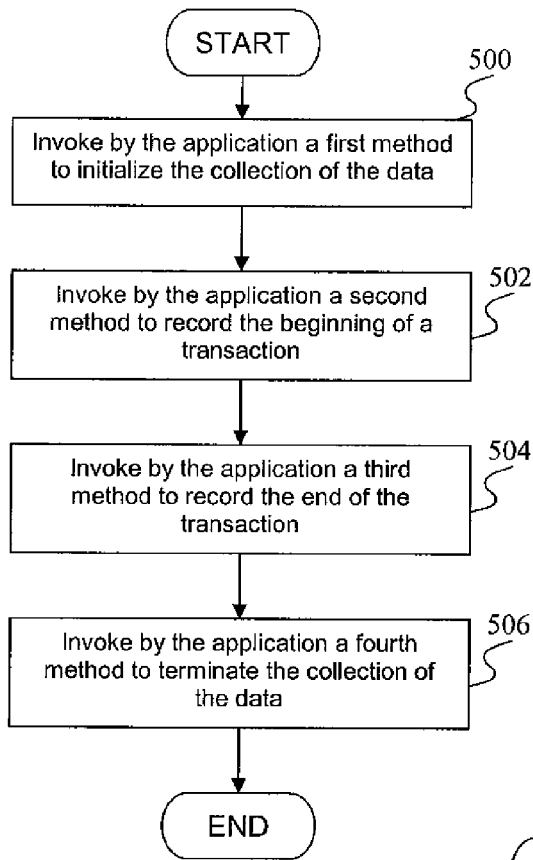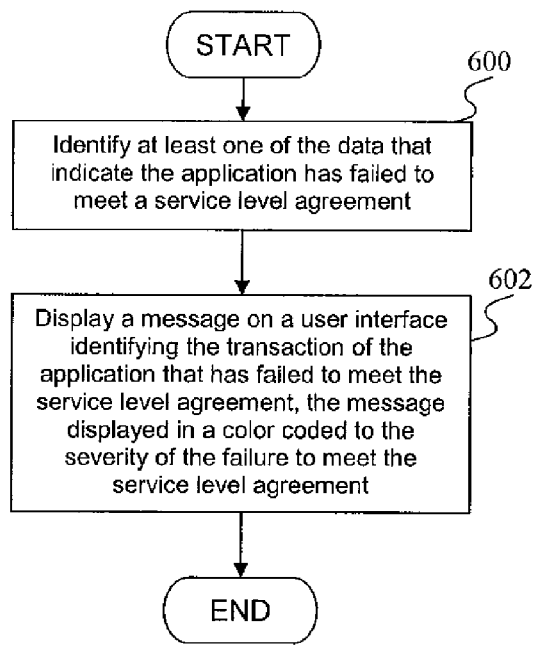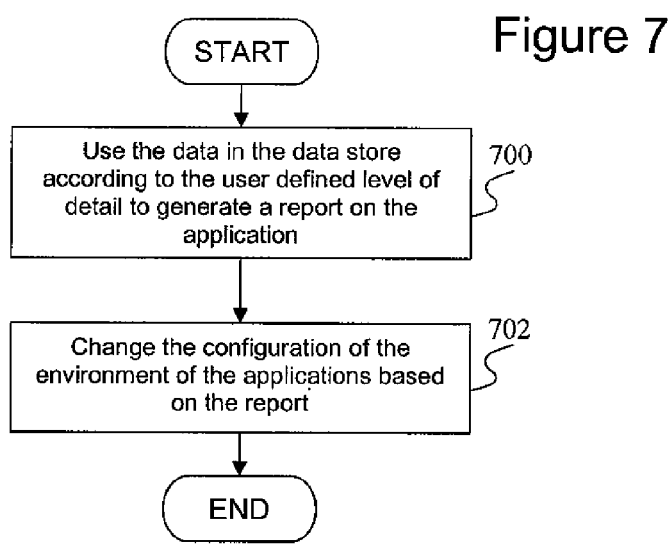

FRAMEWORK FOR APPLICATION MONITORING AND MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer software, and more particularly, but not by way of limitation, to a computer software for monitoring and managing other software applications.

BACKGROUND OF THE INVENTION

In the area of system and software operation and development, it is sometimes useful to monitor applications during operation. Software applications, computer programs, software subroutines, software modules, or software components (hereinafter referred to as applications) may perform transactions without leaving sufficiently detailed historical records. Historical records or other transaction diagnostic information may promote analysis of application processing and management of application operating conditions. Monitoring applications and these intermediate variables may be warranted for a number of other reasons.

The Application Response Measurement (ARM) application programming interface provided a limited framework for developers to add monitoring functions to applications during software development and to cause the applications to generate historical information. The ARM framework included standard libraries supporting a limited number of instrumentation function calls to cause historical information to be captured.

SUMMARY OF THE INVENTION

According to one embodiment, the present disclosure provides a system for monitoring one or more applications. The system includes a data store to maintain data, such as logs stored in a log file, describing transactions involving at least one of the applications. Some of the data includes context specific information which may be of varying length or content. The system includes agents, adapters, a controller, and a console. The agents communicate the data to the data store according to a configured delivery method. The adapters receive the data from the applications and forward the data to one of the agents. The controller manages the agents and is operable to analyze the data. The console is coupled to the controller to receive command inputs from a user to provide the analysis of the data to the user.

According to another embodiment, the present disclosure provides a method for monitoring and managing applications. The method includes defining context specific information to be generated by an application. The method also includes generating data including context specific information about an application, the data including a representation of a workflow. The method includes providing a configurable delivery of the generated data, and sending the data to a data store according to the configured delivery. The method provides for analyzing the data in the data store according to a user defined level of detail to generate a report on the application. The method also includes changing the configuration of the environment of the applications based on the report.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 4 is a flowchart of a method for monitoring and managing applications, according to an embodiment of the present disclosure.

FIG. 5 is a flowchart of a method for monitoring and managing applications, according to an embodiment of the present disclosure.

FIG. 6 is a flowchart of a method for monitoring and managing applications, according to an embodiment of the present disclosure.

FIG. 7 is a flowchart of a method for monitoring and managing applications, according to an embodiment of the present disclosure.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The ARM application programming interface is intended to be a lightweight, quick, and efficient tool to capture information about processes or transactions executing on the same machine where ARM is located. To remain lightweight and efficient, the ARM application programming interface constrains applications to employing a minimum number of data types. This constraint may undesirably limit the information which can be captured about the on-going processing of an application. The present disclosure provides a framework for monitoring and managing applications by generating records or logs. This software framework supports the subject applications reporting context specific attributes in the records or logs that are unique to the subject applications. This framework allows an application to select one of several delivery mechanisms for the logs that best accords with the design constraints of the application. The framework provides adapters to interface to pre-existing commercial off-the-shelf (COTS) applications. The framework provides for processing of the records or logs on a host separate from the application hosts. Processing of records or logs off the application host allows more verbose records or logs to be captured by applications because processing the longer logs does not load down the application hosts.

Figure 1:
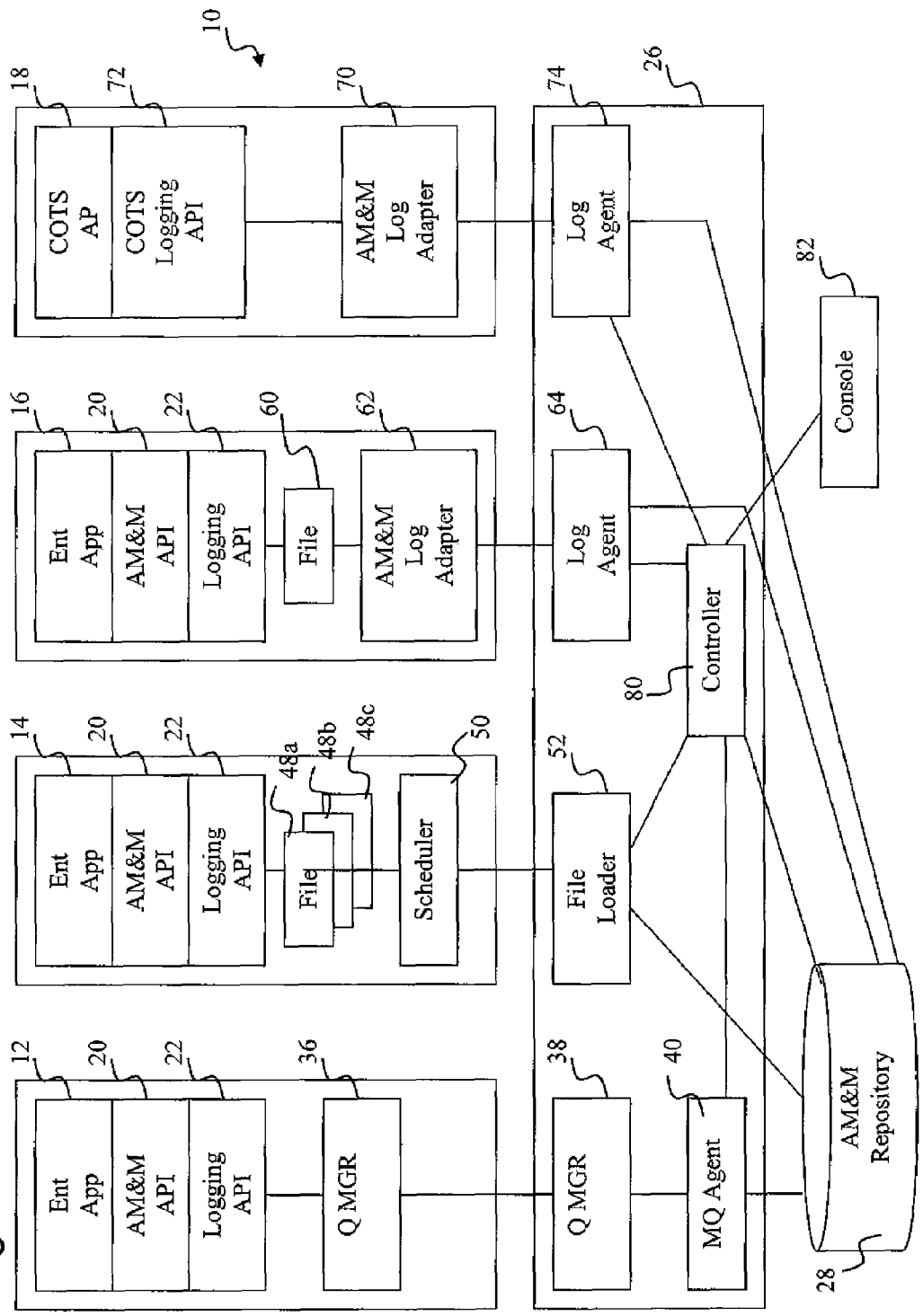
FIG. 1 is a block diagram that depicts an application monitoring and management system according to one embodiment of the present disclosure.

Turning now to FIG. 1 a block diagram of a system 10 using the framework for application monitoring and management is depicted. The system 10 provides for monitoring a first enterprise application 12, a second enterprise application 14, a third enterprise application 16, and a COTS application 18. In another embodiment, more or fewer enterprise applications and/or COTS applications may form a part of the system 10. Each enterprise application 12, 14, 16 is associated with an application monitoring and management application programming interface (API) 20 and a logging API 22. The enterprise application 12, 14, 16 employs the application monitoring and management API 20 to provide information on the state or progress of processing of the enterprise application 12, 14, 16. The application monitoring and management API 20 employs the logging API 22 to generate records or logs from the information on the state or progress of enterprise processing.

The logs are transported to an application monitoring and management host 26. The logs are moved from the application monitoring and management host 26 to an application monitoring and management repository 28 where the logs are stored and may be accessed to generate management reports. The application monitoring and management repository 28 may be a data store, such as a database, director services, flat text file, or other data storage system. A variety of mechanisms are employed to transport the logs to the application monitoring and management host 26. Each of these mechanisms is illustrated in FIG. 1 and will be described.

The first enterprise application 12 is depicted as coupled to a first message queue manager 36. The first enterprise application 12 invokes a method on the application monitoring and management API 20 providing processing information. In other embodiments, the application monitoring and management API 20 may monitor processing and transactions of the enterprise application 12, or other techniques may be used to identify the transactions and processing. The application monitoring and management API 20 invokes a method on the logging API 22 providing the processing information and other information necessary for the logging API 22 to generate a log. The logging API 22 sends a message encapsulating the log to the first message queue manager 36. The message queue manager 36 sends the message to a second message queue manager 38 on the application monitoring and management host 26. This may be referred to as a messaging based log delivery mechanism. A message queue agent 40 monitors the second message queue manager 38, retrieves new messages, extracts the log encapsulated in the message, and sends the log or record to the application monitoring and management repository 28. The IBM MQ Series message queue managers, the JAVA message service (JMS), or other messaging services known to one of ordinary skill in the art may be employed to implement the messaging based log delivery mechanism.

The second enterprise application 14 is depicted as coupled to a plurality of log files 48—a first log file 48a, a second log file 48b, and a third log file 48c. The second enterprise application 14 invokes a method on the application monitoring and management API 20 providing processing information. In other embodiments, the application monitoring and management API 20 may monitor processing and transactions of the enterprise application 12, or other techniques may be used to identify the transactions and processing. The application monitoring and management API 20 invokes a method on the logging API 22 providing the processing information and other information necessary for the logging API 22 to generate a log. The logging API 22 writes a record entry that encapsulates the log in one of the log files 48. A scheduler component 50 periodically reads the contents of the files 48 and transmits the file content to a file loader 52 on the application monitoring and management host 26. This may be referred to as a periodic file based log delivery mechanism. The file loader 52 extracts the logs from the file content and writes the logs to the application monitoring and management repository 28.

The third enterprise application 16 is depicted as coupled to a fourth log file 60. The third enterprise application 16 invokes a method on the application monitoring and management API 20 providing processing information. In other embodiments, the application monitoring and management API 20 may monitor processing and transactions of the enterprise application 12, or other techniques may be used to identify the transactions and processing. The application monitoring and management API 20 invokes a method on the logging API 22 providing the processing information and other information necessary for the logging API 22 to generate a log. The logging API 22 writes a record entry that encapsulates the log in a log file 60. An application monitoring and management log adapter 62 reads the contents of the log file 60 as the file is written, extracts the log from the content of the file, and transmits the log to a first log agent 64 on the application monitoring and management host 26. This may be referred to as a near real-time file based log delivery mechanism. The first log agent 64 writes the log to the application monitoring and management repository 28.

The COTS application 18 is depicted as coupled to an application monitoring and management COTS log adapter 70. The application monitoring and management COTS log adapter 70 receives logs generated by the COTS application 18 or interacts with a COTS logging API 72 to access logs generated by the COTS application 18. The application monitoring and management COTS log adapter 70 sends the logs to a second log agent 74 located on the application monitoring and management host 26. The second log agent 74 writes the log to the application monitoring and management repository 28. The application monitoring and management COTS log adapter 70 may be customized to interact with a specific COTS application 18. It is expected that several application monitoring and management COTS log adapters 70 will be provided, one for each different COTS application 18.

The application monitoring and management API 20, the logging API 22, message queue managers 36, 38, message queue agent 40, file loader 52, scheduler 50, application monitoring and management log adapter 62, application management and monitoring COTS log adapter 70, and log agents 64, 74 may be software components that may execute on a general purpose computer system as described in greater detail hereinafter.

The first log agent 64 and the second log agent 74 perform similar functions and may be distinct executing instances of a single log agent software component. The application monitoring and management log adapters 62 and the application monitoring and management COTS log adapters 70 may be viewed as producers of logs and the log agents 64, 74 are consumers of the logs. Generally, the relationship between the application monitoring and management log adapters 62 and the application monitoring and management COTS log adapters 70 with the log agents 64, 74 need not be one-to-one. There may be fewer log agents 64, 74 if the log agent 64, 74 are capable of managing the flow of logs.

The enterprise applications 12, 14, 16 may be configured to employ any of several distinct log delivery mechanisms described above. A controller 80 is in communication with the message queue agent 40, the file loader 52, and the log agents 64, 74. The controller 80 is operable to configure the log delivery mechanism for the enterprise applications 12, 14, 16. The controller 80 configures the log delivery mechanism of the enterprise applications 12, 14, and 16 based on inputs received from a console 82. Configurable delivery permits controlling the processing load placed on host machines by the application monitoring and management software. Generally speaking, the messaging based log delivery mechanism places a relatively high burden on a host machine or server machine, the near real-time file based log delivery mechanism places a relatively medium burden on a host or server machine, and the periodic file based log delivery mechanism places a relatively low burden on a host or server machine.

The application monitoring and management API 20 provides several methods or functions that applications 12, 14, 16 may be programmed to invoke to generate monitoring information in log messages. In an embodiment, these methods may include a startProcess, a stopProcess, a startTransaction, and a stopTransaction methods. The startProcess method may be invoked at the beginning of a process in an enterprise application 12, 14, 16 to initialize the application monitoring and management API 20 and to record the start of the process as a log message. The stopProcess method tears down the application monitoring and management API 20 and records the end of the process as a log message. The startTransaction method records the beginning of a monitored transaction as a log message and returns a transaction identifier that may be used for stopping the transaction.

The startTransaction method may be invoked with context specific information that is included in the log message and can be of arbitrary format and content. The context specific information may include the present value of one or more variables known to the application or process invoking the startTransaction method. The context specific information may include debugging information useful to the developer during program development and/or troubleshooting the application when it has been put into service. The name of the transaction on which the process is operating and the parent process identifier are known to the process. When invoking the startTransaction method, the process provides the parent process identifier and the name of the transaction as arguments to the startTransaction method invocation. When the startTransaction method is invoked, the application monitoring and management API 20 generates a parent process/child process identity pair. The transaction name and the parent process/child process identity pair are included in the log message generated in association with invocation of the startTransaction method. The transaction name and the parent process/child process identity pair support analysis of the logs stored in the application monitoring and management repository 28 to generate a report on a transaction which may bridge multiple processes and/or multiple enterprise applications 12, 14, 16.

The stopTransaction method may be invoked with context specific information that is included in the log message and can be of arbitrary format and content. The context specific information may include the present value of one or more variables known to the application or process invoking the stopTransaction method. The context specific information may include debugging information useful to the developer during program development and/or troubleshooting the application when it has been put into service. The name of the transaction which the process is working on and status of the transaction are also arguments provided when invoking the stopTransaction method and are included in the log message.

An enterprise transaction, for example "create customer," may involve several enterprise applications 12, 14, 16 and several processes performing intermediate steps of the transaction. For example, "create customer" may entail a first process validating a credit class of the prospective customer and a second process validating a customer address. As enterprise applications 12, 14, 16 interact with one another, starting up processes to handle transactions and shutting down processes, the enterprise applications 12, 14, 16 make calls to the application monitoring and management API 20 which generate log messages capturing the processing of the transactions between the enterprise applications 12, 14, 16. These log messages are conveyed from the application monitoring and management API 20 to the application monitoring and management repository 28 by the mechanisms discussed above. In the case of COTS applications, for example COTS application 18, the logs generated by the COTS applications are processed by the application monitoring and management COTS log adapter 70 to adapt the generated logs to the standard log format of the framework for application monitoring and management. In one embodiment, the logs generated by the COTS applications may not be readable, or in a format that is usable by the present system. In this case, the COTS log adapter 70 is operable to translate, reformat or otherwise make the COTS logs readable in the standard log format of the framework for the present system.

The controller 80, in response to inputs from the console 82, interacts with the application monitoring and management repository 28 to generate transaction processing reports. The console 82 provides a hierarchical view or display of transactions and their components. In an initial display, all transaction names are listed but no further details associated with the transactions are displayed. A user may select a transaction name, for example using a mouse or other input device, and the first level of transaction process components, recorded in the first level of child process logs, are displayed at the console 82.

The first level of child process logs are identified by the controller 80 by finding the logs containing the transaction name in the application monitoring and management repository 28. First level child process logs are distinguished from second level child process logs by the parent process/child process identity pair contained by each log. The console may display the time stamp of the log messages, the processing status of the log messages, any context specific information that may be embedded in the log message, and other information. Clicking on one of the first level of child process logs causes the controller 80 to analyze the logs in the application monitoring and management repository 28 to identify the child process logs associated with the selected first level child process and to display these second level child process log messages. The controller 80 and the console 82 may be software components that may execute on a general purpose computer system.

The described system 10 provides end-to-end transaction visibility at user controlled levels of details. In one circumstance, an operator may be satisfied examining the process of a transaction at the first level of process logs. In another circumstance, at the user's discretion, the operator may use the system 10 to analyze the progress of a transaction at the third or fourth level of process logs to obtain greater detail at each level. The log analysis activity of the controller 80 is performed on the application monitoring and management host 26, thereby sparing the application server of the burden of supporting the log analysis processing.

Figure 2:
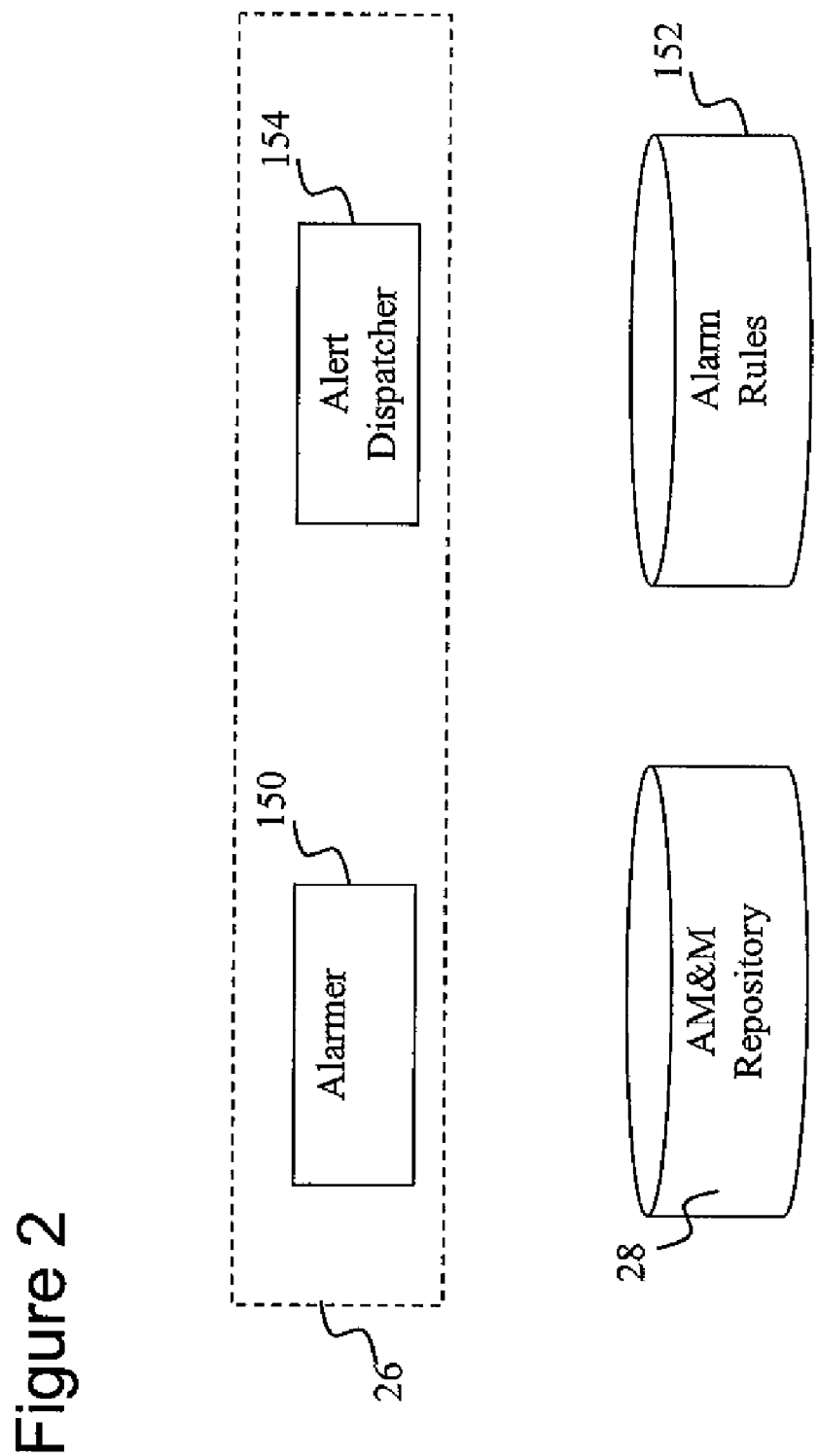
FIG. 2 depicts is a block diagram that depicts a system for generating alerts based on information contained in the application monitoring and management system.

Turning now to FIG. 2, an alarmer 150 is shown in communication with the application monitoring and management repository 28. The alarmer 150 periodically analyzes the logs contained in the application monitoring and management repository 28, in accordance with rules contained by an alarm rules data store 152. The alarmer 150 may, for example, determine if any transactions or application processes are experiencing abnormal delays or other difficulties for which administrative personnel may desirably receive notification. Examples of delays or difficulties include when applications get stuck in processing transactions and may need administrative intervention to progress further. The alarm rules may identify normal metrics for processes and alarm thresholds for minor, medium, major metrics. For example, a process may have a normal completion time metric of 5 minutes, have a minor processing time threshold of 7 minutes, a medium processing time threshold of 10 minutes, and a major time threshold of 20 minutes. If the alarm rules indicate that a transaction is experiencing an abnormal delay, the alarmer 150 encapsulates this information in a message to an alert dispatcher 154 that sends an appropriate notification or alarm to the responsible persons. The notifications may indicate an alarm severity level, for example a minor alarm severity, a medium alarm severity, or a major alarm severity. The alarm rules may also identify service level agreements (SLAs) for specific transactions and/or portions of transactions, and the alarmer 150 may analyze the logs contained in the application monitoring and management repository 28 in accordance with the service level agreements contained in the rules to determine if any applications or processes are failing to meet their service level agreements. When a service level agreement is broken, the alarm 150 may encapsulate this information in a message to the alert dispatcher 154 that sends an appropriate notification or alarm to the responsible persons. The alerts described above also may be referred to as alarms. These alarms are merely examples of some of the capabilities of the present system, but other alarms of varying degrees of simplicity or complexity that involve monitoring and analysis of aspects of the applications and/or transactions may be employed, all of which are within the spirit and scope of the present disclosure and will be apparent to those skilled in the art.

The alert dispatcher 154 may send an email, a voicemail message, a page, or other message, indicating the alarm severity level, to the responsible persons. The alert dispatcher 154 may also provide alarm text to the console 82 for display. The console 82 may display the alarm text color coded to indicate the severity level of the alarm condition. The alarmer 150 and alert dispatcher 154 are software components that execute on the application monitoring and management host 26. In another embodiment, the alarmer 150 and the alert dispatcher 154 may execute on a separate host machine (not shown). In an embodiment, the alert dispatcher 154 forms a part of the alarmer 150. The alarm rules data store 152 is depicted in FIG. 2 as an independent data store, but in an alternate embodiment the alarm rules data store 152 may be a file or a plurality of files in the file system of the application monitoring and management host 26. Storing the rules in a file or in a data store promotes ease of rules revision. In an embodiment, the function of the alarmer 150 may be provided by the controller 80.

FIG. 4 is a flowchart of a method for monitoring and managing applications, according to an embodiment of the present disclosure. The process begins by defining a context specific information to be generated by an application on each of a plurality of application hosts (block 400). The process further includes generating data including the context specific information about the application on each of the plurality of application hosts, the data including a representation of a workflow (block 402).

The process further includes delivering the generated data from the plurality of application hosts to a monitoring host separate from the plurality of application hosts using a plurality of communication mechanisms comprising two or more elements of the group consisting of a message based communication mechanism, a log based communication mechanism, and a file based communication mechanism, wherein one of the plurality of communication mechanisms is on each of the plurality of application hosts, and wherein one of the plurality of communication mechanisms is configurable (block 404). The process further includes receiving by the monitoring host separate from the plurality of application hosts, the generated data using a plurality of reception mechanisms on the monitoring host comprising two or more elements of the group consisting of a message based reception mechanism, a log based reception mechanism, and a file based reception mechanism, and wherein each of the plurality of communication mechanisms delivers the generated data to a corresponding one of the plurality of reception mechanisms (block 406).

The process further includes configuring the configurable communication mechanism by a controller on the monitoring host separate from the plurality of application hosts (block 408). The process further includes sending the received data to a data store according to the configured configurable communication mechanism (block 410). The process further includes analyzing the data in the data store according to a user defined level of detail (block 412). The process terminates thereafter.

FIG. 5 is a flowchart of a method for monitoring and managing applications, according to an embodiment of the present disclosure. The process shown in FIG. 5 may be in addition to the process shown in FIG. 4.

The process begins by invoking by the application a first method to initialize the collection of the data (block 500). The process further includes invoking by the application a second method to record the beginning of a transaction (block 502). The process further includes invoking by the application a third method to record the end of the transaction (block 504). The process further includes invoking by the application a fourth method to terminate the collection of the data (block 506). The process terminates thereafter.

FIG. 6 is a flowchart of a method for monitoring and managing applications, according to an embodiment of the present disclosure. The process shown in FIG. 6 may be in addition to the process shown in FIG. 4.

The process begins by identifying at least one of the data that indicate the application has failed to meet a service level agreement (block 600). The process further includes displaying a message on a user interface identifying the transaction of the application that has failed to meet the service level agreement, the message displayed in a color coded to the severity of the failure to meet the service level agreement (block 602).

FIG. 7 is a flowchart of a method for monitoring and managing applications, according to an embodiment of the present disclosure. The process shown in FIG. 7 may be in addition to the process shown in FIG. 4.

The process begins by using the data in the data store according to the user defined level of detail to generate a report on the application (block 700). The process further includes changing the configuration of the environment of the applications based on the report (block 702). The process terminates thereafter.

Figure 3:
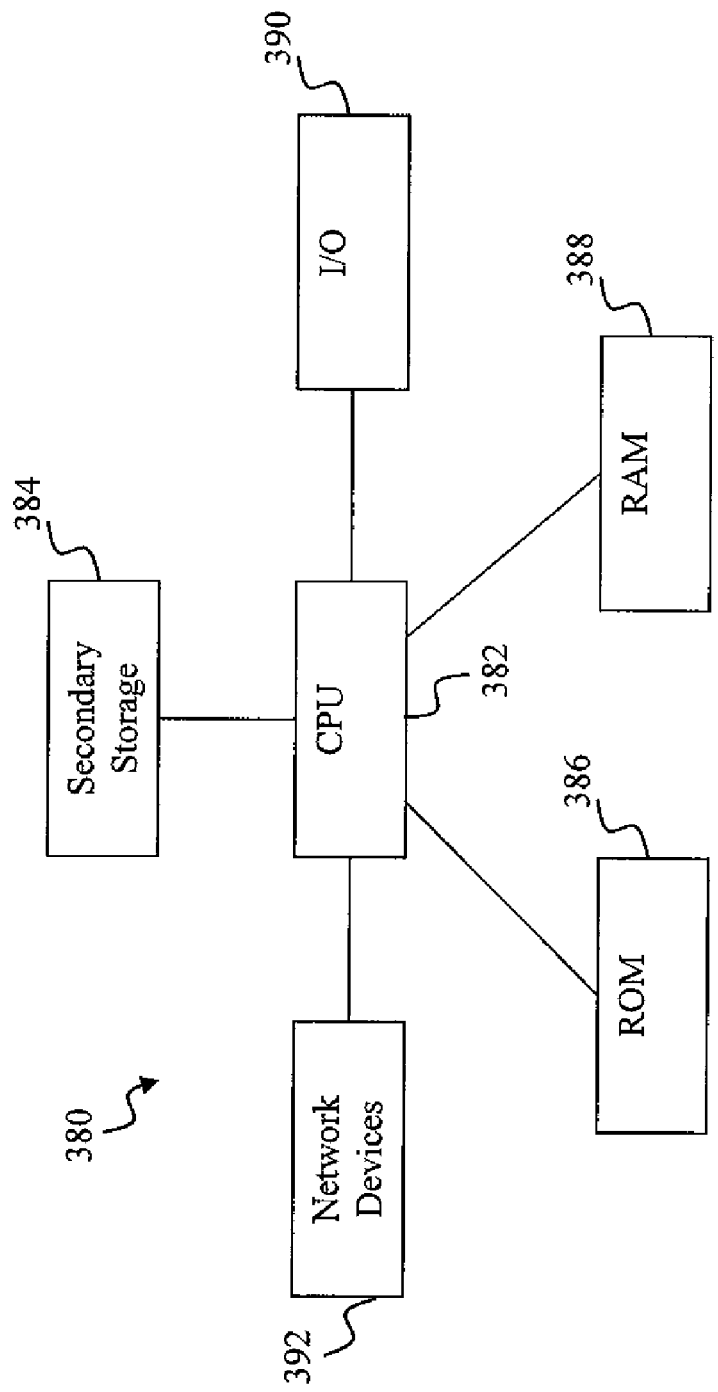
FIG. 3 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specified forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for monitoring a plurality of applications, comprising:
    a data store configured to maintain data describing transactions involving the plurality of applications, at least some of the data includes context specific information of a length and content that is specific to the processing of the plurality of applications, wherein a first portion of the plurality of applications operate on a first application host, a second portion of the plurality of applications operate on a second application host, a third portion of the plurality of applications operate on a third application host, and a fourth portion of the plurality of applications operate on a fourth application host, wherein the first, second, third, and fourth application hosts are different from each other;
    a monitoring host that operates on a host separate from the first, second, third, and fourth application hosts, the monitoring host comprising:
        a first data reception mechanism comprising a first message queue manager configured to communicate with both a second message queue manager operating on the first application host and the data store, wherein the second message queue manager comprises a first data delivery mechanism;
        a second data reception mechanism comprising a first file loader configured to communicate with both a scheduler operating on the second application host and the data store, wherein the scheduler comprises a second data delivery mechanism;
        a third data reception mechanism comprising a first log agent configured to communicate with both a first application monitoring and management log adapter operating on the third application host and the data store, wherein the first application monitoring and management log adapter comprises a third data delivery mechanism;

a fourth data reception mechanism comprising a second log agent configured to communicate with both a second application monitoring and management log adapter operating on the fourth application host and the data store, wherein the second application monitoring and management log adapter comprises a fourth data delivery mechanism; and a controller that configures at least one of the first, second, third, and fourth data delivery mechanisms based on command inputs, and the controller further configured to analyze the data;

wherein the first data delivery mechanism is configured both to receive data from the first portion of the plurality of applications that are operating on the first application host and to forward the data to the first data reception mechanism, wherein the second data delivery mechanism is configured both to receive data from the second portion of the plurality of applications that are operating on the second application host and to forward the data to the second data reception mechanism, wherein the third data delivery mechanism is configured both to receive data from the third portion of the plurality of applications that are operating on the third application host and to forward the data to the third data reception mechanism, and wherein the fourth data delivery mechanism is configured both to receive data from the fourth portion of the plurality of applications that are operating on the fourth application host and to forward the data to the fourth data reception mechanism; and a console coupled to the controller and configured to receive the command inputs from a user and to provide the analysis of the data to the user.

2. The system of claim 1, wherein the data is a log.

3. The system of claim 1, wherein at least one of the plurality of applications is a commercial off-the-shelf application.

4. The system of claim 3, wherein the data delivery mechanism on at least one of the first, second, third, and fourth application hosts includes one of the first and second application monitoring and management commercial off-the-shelf log adapters configured to receive the data from the commercial off-the-shelf application according to an interface determined by the commercial off-the-shelf application.

5. The system of claim 1, wherein one of the first, second, third, and fourth data delivery mechanisms on at least one of the first, second, third, and fourth application hosts includes the second message queue manager coupled to communicate with one of the plurality of applications to receive the data from the one of the plurality of applications, the second message queue manager configured to arrange the data as a message;

wherein the monitoring host includes a message agent that receives the message, extracts the data from the message, and sends the data to the data store, the controller configured to manage the message agent, and the first, second, third, and fourth data reception mechanisms further include the first message queue manager configured to communicate the message between the second message queue manager and the message agent.

6. The system of claim 5, wherein the first message queue manager and the second queue message manager are MQ Series message queue managers.

7. The system of claim 5, wherein the first message queue manager and the second message queue manager are Java Message Service message queue managers.

8. The system of claim 1, wherein one of the first, second, third, and fourth data delivery mechanisms on at least one of the first, second, third, and fourth application hosts includes a plurality of files associated with one of the plurality of applications, the files containing the data describing the processing of the one of the plurality of applications, wherein the second data reception mechanism includes the file loader component configurable via the controller, the file loader component configured to extract the data from the plurality of files and to send the data to the data store, the file loader component configured on the monitoring host, and the second data delivery mechanism further includes the scheduler component associated with the one of the plurality of applications and the scheduler component configured to periodically copy the files to the file loader component.

9. The system of claim 1, wherein context specific information includes information related to debugging the at least one of the plurality of applications, the first, second, third, and fourth data delivery mechanisms configured to receive the context specific information.

10. The system of claim 1, wherein the data describes a sequence of processing of one of the transactions.

11. The system of claim 1, wherein the command inputs to the console include selection of a level of detail of the data describing the transactions and wherein the reports based on the data contain the level of detail selected in the command input.

12. The system of claim 1, further comprising:

a rules data store containing a plurality of analysis rules for evaluating the data describing the transactions; and an alarmer configured to use the analysis rules to evaluate the data of the transactions and to provide a notice for delayed and failed transactions.

13. A computer implemented method for monitoring and managing a plurality of applications, comprising:

maintaining, on a data store, data describing transactions involving the plurality of applications, at least some of the data includes context specific information of a length and content that is specific to the processing of the plurality of applications;

operating a first portion of the plurality of applications on a first application host;

operating a second portion of the plurality of applications on a second application host;

operating a third portion of the plurality of applications on a third application host;

operating a fourth portion of the plurality of applications on a fourth application host, wherein the first, second, third, and fourth application hosts are different from each other;

operating a monitoring host on a host separate from the first, second, third, and fourth application hosts, the monitoring host comprising:

a first data reception mechanism comprising a first message queue manager communicating with both a second message queue manager operating on the first application host and the data store, wherein the second message queue manager comprises a first data delivery mechanism;

a second data reception mechanism comprising a first file loader communicating with both a scheduler operating on the second application host and the data store, wherein the scheduler comprises a second data delivery mechanism;

a third data reception mechanism comprising a first log agent communicating with both a first application monitoring and management log adapter operating on the third application host and the data store, wherein the first application monitoring and management log adapter comprises a third data delivery mechanism;

a fourth data reception mechanism comprising a second log agent communicating with both a second application monitoring and management log adapter operating on the fourth application host and the data store, wherein the second application monitoring and management log adapter comprises a fourth data delivery mechanism; and a controller configuring at least one of the first, second, third, and fourth data delivery mechanisms based on command inputs, and the controller further analyzing the data;

wherein the first data delivery mechanism both receives data from the first portion of the plurality of applications that are operating on the first application host and forwards the data to the first data reception mechanism, wherein the second data delivery mechanism both receives data from the second portion of the plurality of applications that are operating on the second application host and forwards the data to the second data reception mechanism, wherein the third data delivery mechanism both receives data from the third portion of the plurality of applications that are operating on the third application host and forwards the data to the third data reception mechanism, and wherein the fourth data delivery mechanism both receives data from the fourth portion of the plurality of applications that are operating on the fourth application host and forwards the data to the fourth data reception mechanism;

receiving, at a console coupled to the controller, the command inputs from a user; and providing the analysis of the data to the user.

14. The method of claim 13, wherein the context specific information is further defined as a first context specific information based on the first application and a second context specific information based on the second application, the first and second context specific information having different lengths and content.

15. The method of claim 13, wherein at least one of the plurality of applications employs the configured configurable communication mechanism.

16. The method of claim 15, further including:

invoking by at least one of plurality of applications a first method to initialize the collection of the data;

invoking by at least one of the plurality of applications a second method to record the beginning of a transaction;

invoking by at least one of the plurality of applications a third method to record the end of the transaction; and invoking by at least one of the plurality of applications a fourth method to terminate the collection of the data.

17. The method of claim 13, wherein at least one of plurality of applications executes on a first system, the data store is external to the first system, and the analyzing the data occurs on a second system.

18. The method of claim 13, wherein at least one of the plurality of applications is a commercial off-the-shelf application.

19. The method of claim 13, further including:

identifying at least one of the data that indicate at least one of the plurality of applications has failed to meet a service level agreement.

20. The method of claim 19, further including:

displaying a message on a user interface identifying the transaction of at least one of the plurality of applications that has failed to meet the service level agreement, the message displayed in a color coded to the severity of the failure to meet the service level agreement.

21. The method of claim 13, further comprising:

using the data in the data store according to the user defined level of detail to generate a report on at least one of the plurality of applications; and changing the configuration of the environment of at least one of the plurality of applications based on the report.

* * * * *

UNITED STATES PATENT AND TRADEMARK OFFICE
CERTIFICATE OF CORRECTION

PATENT NO.       : 7,640,337 B1                                    Page 1 of 1
APPLICATION NO.  : 10/975276
DATED            : December 29, 2009
INVENTOR(S)      : Fultz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1077 days.

Signed and Sealed this

Ninth Day of November, 2010

David J. Kappos
*Director of the United States Patent and Trademark Office*